United States Patent
Laselva et al.

(10) Patent No.: US 10,820,228 B2
(45) Date of Patent: Oct. 27, 2020

(54) POWER EFFICIENCY IN MULTIPLE RADIO ACCESS TECHNOLOGIES SCENARIOS

(71) Applicant: NOKIA SOLUTIONS AND NETWORKS OY, Espoo (FI)

(72) Inventors: Daniela Laselva, Klarup (DK); Jeroen Wigard, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 58 days.

(21) Appl. No.: 16/302,739

(22) PCT Filed: May 20, 2016

(86) PCT No.: PCT/EP2016/061408
§ 371 (c)(1),
(2) Date: Nov. 19, 2018

(87) PCT Pub. No.: WO2017/198308
PCT Pub. Date: Nov. 23, 2017

(65) Prior Publication Data
US 2019/0320339 A1  Oct. 17, 2019

(51) Int. Cl.
*H04W 28/02* (2009.01)
*H04W 52/02* (2009.01)
(Continued)

(52) U.S. Cl.
CPC ... *H04W 28/0221* (2013.01); *H04W 52/0238* (2013.01); *H04W 52/246* (2013.01);
(Continued)

(58) Field of Classification Search
CPC ......... H04W 28/0221; H04W 52/0225; H04W 52/0238; H04W 52/246; H04W 72/02;
(Continued)

(56) References Cited

U.S. PATENT DOCUMENTS

2013/0005333 A1   1/2013  Chueh et al.
2013/0045744 A1*  2/2013  Dimpflmaier ......... H04W 36/14
                                                 455/437

(Continued)

FOREIGN PATENT DOCUMENTS

WO   WO 2014/184347 A1   11/2014

OTHER PUBLICATIONS

International Search Report and Written Opinion dated Feb. 7, 2017 corresponding to International Patent Application No. PCT/EP2016/061408.

(Continued)

*Primary Examiner* — Robert J Lopata
(74) *Attorney, Agent, or Firm* — Squire Patton Boggs (US) LLP

(57) ABSTRACT

There are provided measures for achieving power efficiency in multiple radio access technologies scenarios. Such measures exemplarily comprise, in a communication scenario using a first radio link and for communication using a second radio link, said first radio link and said second radio link utilizing different radio access technologies, estimating a first uplink power efficiency for said first radio link, estimating a second uplink power efficiency for said second radio link, comparing said first uplink power efficiency and said second uplink power efficiency, and selecting said first radio link or said second radio link as a primary radio link to be utilized for an uplink transmission based on a result of said comparing.

17 Claims, 9 Drawing Sheets

(51) Int. Cl.
*H04W 52/24* (2009.01)
*H04W 72/02* (2009.01)
*H04W 72/04* (2009.01)
*H04W 84/12* (2009.01)

(52) U.S. Cl.
CPC ....... *H04W 72/02* (2013.01); *H04W 72/0473* (2013.01); *H04W 84/12* (2013.01)

(58) Field of Classification Search
CPC .............. H04W 72/0473; H04W 84/12; Y02D 70/124; Y02D 70/126; Y02D 70/1262; Y02D 70/14; Y02D 70/142; Y02D 70/144
USPC ......................................................... 370/230
See application file for complete search history.

(56) References Cited

U.S. PATENT DOCUMENTS

| | | | |
|---|---|---|---|
| 2015/0282103 A1* | 10/2015 | Immonen ............ | H04W 52/346 370/329 |
| 2016/0183203 A1* | 6/2016 | Larsson .............. | H04W 52/386 370/329 |
| 2016/0255665 A1* | 9/2016 | Futaki ................... | H04W 76/27 370/329 |
| 2016/0262149 A1* | 9/2016 | Futaki ..................... | H04L 5/001 |
| 2016/0338109 A1* | 11/2016 | Rahman ............. | H04W 56/005 |
| 2016/0338140 A1* | 11/2016 | Zhang .................. | H04W 36/34 |
| 2017/0041940 A1* | 2/2017 | Falconetti ............... | H04L 5/006 |
| 2017/0171853 A1* | 6/2017 | Lindoff ................ | H04W 48/16 |
| 2017/0325143 A1* | 11/2017 | Dai ....................... | H04W 36/34 |
| 2018/0206282 A1* | 7/2018 | Singh ................... | H04W 88/06 |
| 2019/0098640 A1* | 3/2019 | Holakouei ........... | H04L 1/1825 |

OTHER PUBLICATIONS

CMCC: "Network Selection for WLAN/3GPP Radio Interworking," 3GPP Draft; R2-130973; 3GPP TSG-RAN WG2 Meeting #81bis, Chicago, USA, Apr. 4, 2013; XP050699128.

Communication pursuant to Article 94(3) EPC dated Mar. 9, 2020 corresponding to European Patent Application No. 16724881.4.

* cited by examiner

POWER EFFICIENCY IN MULTIPLE RADIO ACCESS TECHNOLOGIES SCENARIOS

FIELD

The present invention relates to power efficiency in multiple radio access technologies scenarios. More specifically, the present invention exemplarily relates to measures (including methods, apparatuses and computer program products) for realizing power efficiency in multiple radio access technologies scenarios.

BACKGROUND

The present specification generally relates to utilization of one or more radio links for uplink transmissions under consideration of available transmission power of mobile devices.

The present invention is generally applicable to the area of LTE-WLAN aggregation (LWA; LTE: Long Term Evolution, WLAN: wireless local area network). According to known LWA functionalities, downlink bearer split and downlink bearer switch is supported. However, according to 3GPP LTE Rel. 13, the only allowed uplink traffic mode is LTE Access, i.e. uplink traffic cannot be sent over WLAN for a user equipment (UE) configured with LWA.

Accordingly, the present invention particularly relates to uplink data transmission on WLAN in a scenario including uplink bearer switch and uplink bearer split, e.g. a 3GPP LTE Rel. 14 (or higher) scenario, where uplink traffic may be sent over LTE, WLAN, or split between them.

The present invention is further applicable to LTE-WLAN radio level integration via IPsec tunneling (LWIP; IPsec: internet protocol security).

For implementation of uplink bearer split in the above outlined scenario, an uplink bearer split approach defined for LTE dual connectivity (DC) may be considered as the baseline for LWA. In this regard it is noted that bearer split means that a bearer is implemented by more than one (generally two) radio links, on which transmission is effected in parallel. Basically, according to LTE DC, an uplink bearer split is triggered on the basis of a (eNB-configured) buffer-size threshold. When the UE uplink buffer size is below the threshold the UE will use the (static) primary link, while when the threshold is exceeded the UE can use bearer split and determine how to realize the bearer split.

FIG. 7 is a schematic diagram illustrating the mentioned principle. In particular, in FIG. 7 a UE uplink buffer 71 is illustrated, where the mentioned uplink buffer threshold is indicated with 72.

If the actual (filling) state of the uplink buffer 71 is below (or equal to) the threshold 72 (i.e. is in the range 73), bearer switching (utilizing the primary radio link) is used, where the primary radio link is statically configured.

If, on the other hand, the (filling) state of the uplink buffer (71) exceeds the threshold 72 (i.e. is in the range 74), bearer split can be used, where the UE decides based on implementation over which link (i.e. both primary radio link and secondary radio link or only either of both) data is to be transmitted.

However, in the uplink the limited resource often is the UE transmission power. Most of the UEs can be expected to be equipped with a single power amplifier (PA). Even if the UE is equipped with one PA per radio, there could be regulations which limit the maximum transmission power by the UE in a given frequency band and regions.

Hence, the problem arises that respective configurations in the above outlined scenario of uplink traffic including uplink bearer switch and uplink bearer split cannot be implemented by a UE due to transmission power insufficiencies.

Hence, there is a need to provide for power efficiency in multiple radio access technologies scenarios.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method of a terminal configured for communication using a first radio link and for communication using a second radio link, said first radio link and said second radio link utilizing different radio access technologies, said method comprising estimating a first uplink power efficiency for said first radio link, estimating a second uplink power efficiency for said second radio link, comparing said first uplink power efficiency and said second uplink power efficiency, and selecting said first radio link or said second radio link as a primary radio link to be utilized for an uplink transmission based on a result of said comparing.

According to an exemplary aspect of the present invention, there is provided a method of a network element configured for managing communication using a first radio link and communication using a second radio link, said first radio link and said second radio link utilizing different radio access technologies, said method comprising transmitting first configuration information indicative of a pre-configured primary radio link among said first radio link and said second radio link to be utilized for a transmission, and transmitting second configuration information indicative of a predetermined margin parameter to be considered for selection of said first radio link or said second radio link as said primary radio link.

According to an exemplary aspect of the present invention, there is provided an apparatus configured for communication using a first radio link and for communication using a second radio link, said first radio link and said second radio link utilizing different radio access technologies, the apparatus comprising at least one processor, at least one memory including computer program code, and at least one interface configured for communication with at least another apparatus, the at least one processor, with the at least one memory and the computer program code, being configured to cause the apparatus to perform estimating a first uplink power efficiency for said first radio link, estimating a second uplink power efficiency for said second radio link, comparing said first uplink power efficiency and said second uplink power efficiency, and selecting said first radio link or said second radio link as a primary radio link to be utilized for an uplink transmission based on a result of said comparing.

According to an exemplary aspect of the present invention, there is provided an apparatus configured for managing communication using a first radio link and communication using a second radio link, said first radio link and said second radio link utilizing different radio access technologies, the apparatus comprising at least one processor, at least one memory including computer program code, and at least one interface configured for communication with at least another apparatus, the at least one processor, with the at least one memory and the computer program code, being configured to cause the apparatus to perform transmitting first configuration information indicative of a pre-configured primary radio link among said first radio link and said second radio link to be utilized for a transmission, and transmitting second configuration information indicative of a predetermined margin parameter to be considered for selection of said first radio link or said second radio link as said primary radio link.

According to an exemplary aspect of the present invention, there is provided an apparatus configured for communication using a first radio link and for communication using a second radio link, said first radio link and said second radio link utilizing different radio access technologies, the apparatus comprising estimating circuitry configured to estimate a first uplink power efficiency for said first radio link, and to estimate a second uplink power efficiency for said second radio link, comparing circuitry configured to compare said first uplink power efficiency and said second uplink power efficiency, and selecting circuitry configured to select said first radio link or said second radio link as a primary radio link to be utilized for an uplink transmission based on a result of said comparing circuitry.

According to an exemplary aspect of the present invention, there is provided an apparatus configured for managing communication using a first radio link and communication using a second radio link, said first radio link and said second radio link utilizing different radio access technologies, the apparatus comprising transmitting circuitry configured to transmit first configuration information indicative of a pre-configured primary radio link among said first radio link and said second radio link to be utilized for a transmission, and to transmit second configuration information indicative of a predetermined margin parameter to be considered for selection of said first radio link or said second radio link as said primary radio link.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an optimal use of the UE transmission power which is the limited resource to thereby solve at least part of the problems and drawbacks identified in relation to the prior art.

By way of exemplary embodiments of the present invention, there is provided power efficiency in multiple radio access technologies scenarios. More specifically, by way of exemplary embodiments of the present invention, there are provided measures and mechanisms for realizing power efficiency in multiple radio access technologies scenarios.

Thus, improvement is achieved by methods, apparatuses and computer program products enabling/realizing power efficiency in multiple radio access technologies scenarios.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
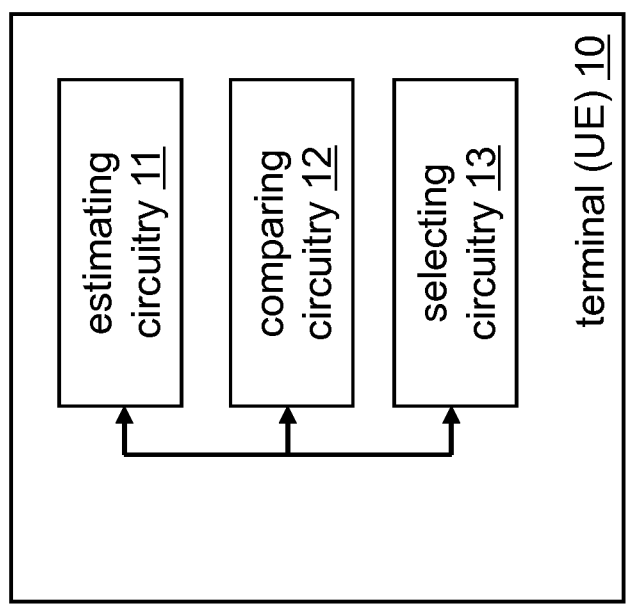
FIG. 1 is a block diagram illustrating an apparatus according to exemplary embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to $3^{rd}$ Generation Partnership Project (3GPP) specifications being used as non-limiting examples for certain exemplary network configurations and deployments. In particular, LTE-WLAN aggregation and LTE-WLAN radio level integration via IPsec tunneling are used as non-limiting examples for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) power efficiency in multiple radio access technologies scenarios.

As mentioned above, in the uplink the limited resource often is the UE transmission power. Namely, most of the UEs can be expected to be equipped with a single PA, and even if the UE is equipped with one PA per radio, there could be regulations which limit the maximum transmission power by the UE in a given frequency band and regions.

In the case of simultaneous uplink transmissions over two or more radios it is thus to be determined how this limited resource should be distributed over e.g. 3GPP and e.g. non-3GPP RATs (RAT: radio access technology). One possibility would be to split the power equally to the RATs the UE is connected to. However, as another possibility, the UE may also use for instance 90% of its output power to one RAT (for instance Wi-Fi) and only 10% to another RAT (for instance LTE).

From the UE battery point of view, optimally, the UE throughput should be maximized, such that the UE can move back to idle/sleeping mode as fast as possible. In order to maximize the throughput, the output power should be used at the RAT where the highest throughput is achieved. The throughput on a RAT per power unit depends on several factors:

Interference situation: If there is more interference, higher power levels are used to reach the same SINR at the base station/access point.

Attenuation to the base station/access point: In particular how far the UE is away from the network side and what frequency is used.

Spectral efficiency: Including effects from overhead. Different systems have different spectral efficiencies, depending also on different releases. Control information overheads can also be different and should be taken into account.

Delays due to scheduling opportunities: A system like Wi-Fi works such that after a UE has been transmitting it cannot transmit to the system during a certain time interval in order to give other UEs the opportunity to transmit. This has an impact on the overall throughput as well and thus on the overall power consumption.

Exemplary embodiments of the present invention are based on the above considerations resulting in that there may be several reasons according to which the use of the transmit power over one radio at a time is beneficial instead of splitting the power over two or more radios. This means that bearer switch may be an important transmission mode even when bearer split is actually triggered, e.g., based on UE buffer size as in DC. Also a more optimal selection of the primary link when bearer split cannot be used could be beneficial.

Underlying exemplary embodiments of the present invention as well, another reason why bearer switch could be an advantageous approach in several situations is that 3GPP (i.e. a 3GPP network element, e.g. an evolved Node (eNodeB, eNB)) controls only the transmit power of UL LTE (UL: uplink). However, the network element cannot control the transmit power used for the UL Wi-Fi transmissions. Wi-Fi devices can be expected to often change transmission (Tx) power as a function of modulation and coding scheme (MCS), and several dB of Tx power difference between the lowest rate and the highest rate is not uncommon. If the UE is forced to use bearer split and split somehow the power between LTE and WLAN, it may need to reduce the adopted MCS over WLAN leading to suboptimal use of the Wi-Fi channel.

Hence, according to exemplary embodiments of the present invention there is provided an eNB assisted approach to guide the UE to determine how to select the primary connection (e.g. LTE or WLAN), how to fast switch it, and when to use split bearer. According to the approach of the present invention, a more optimal use of the UE transmit power can be achieved, which in the uplink often is the limiting resource.

It is known to estimate a downlink path loss towards the eNB by the UE on the basis of an LTE reference signal received power (RSRP) measurement e.g. for uplink power control. Uplink path loss is estimated based on downlink path loss removing the fast fading component.

Furthermore, a transmission power control (TPC) is known, which deals with the control of (network side) stations' transmission power levels based on Local Maximum Transmit Power Level of its cell.

In this regard, it is noted that a station (STA) can dynamically adjust the transmission power of every frame as long as its transmission power is less than the Local Maximum Transmit Power Level. Here, the local maximum transmit power level may be updated dynamically as the environment conditions change. The level is announced by an access point (AP) to the STAs by using beacons, probe response and association response frames. The objective of such TPC procedure is to conserve the interference to adjacent cells to a low level and to ensure reliable transmission of frames of the stations.

It is further known that WLAN measurements performed by the UE for WLAN purposes include WLAN received signal strength indicator (RSSI) and received channel power indicator (RCPI) as metric for signal strength, and received signal to noise indicator (RSNI) as metric for signal quality. Downlink/uplink path loss towards the WLAN AP can be estimated based on those metrics.

Finally, the following equation for LTE power control is known:

$$P\_PUSCH = \min\{P\max, Po\_PUSCH + 10*\text{Log}(\#PRBs) + \alpha*PL + \delta mcs + f(\Delta i)\}.$$

Here,

Pmax is the maximum allowed transmit power,

PRBs is the number of physical resource blocks (PRBs) allocated to the UE,

P0 is cell/UE specific parameter signaled by radio resource control (RRC), $\alpha$ is the path loss compensation factor, PL is the downlink path loss estimate, $\delta$ mcs is cell/UE specific modulation and coding scheme defined for LTE, and $f(\Delta i)$ is UE specific and is a closed loop correction value.

FIG. 1 is a block diagram illustrating an apparatus according to exemplary embodiments of the present invention. The apparatus may be a terminal 10 such as a user equipment, mobile station, modem (configured for communication using a first radio link and for communication using a second radio link, said first radio link and said second radio link utilizing different radio access technologies) comprising an estimating circuitry 11, a comparing circuitry 12, and a selecting circuitry 13. The estimating circuitry 11 estimates a first uplink power efficiency for said first radio link. Further, the estimating circuitry 11 estimates a second uplink power efficiency for said second radio link. Further, the comparing circuitry 12 compares said first uplink power efficiency and said second uplink power efficiency. Finally, the selecting circuitry 13 selects said first radio link or said second radio link as a primary radio link to be utilized for an uplink transmission based on a result of said comparing.

Figure 5:
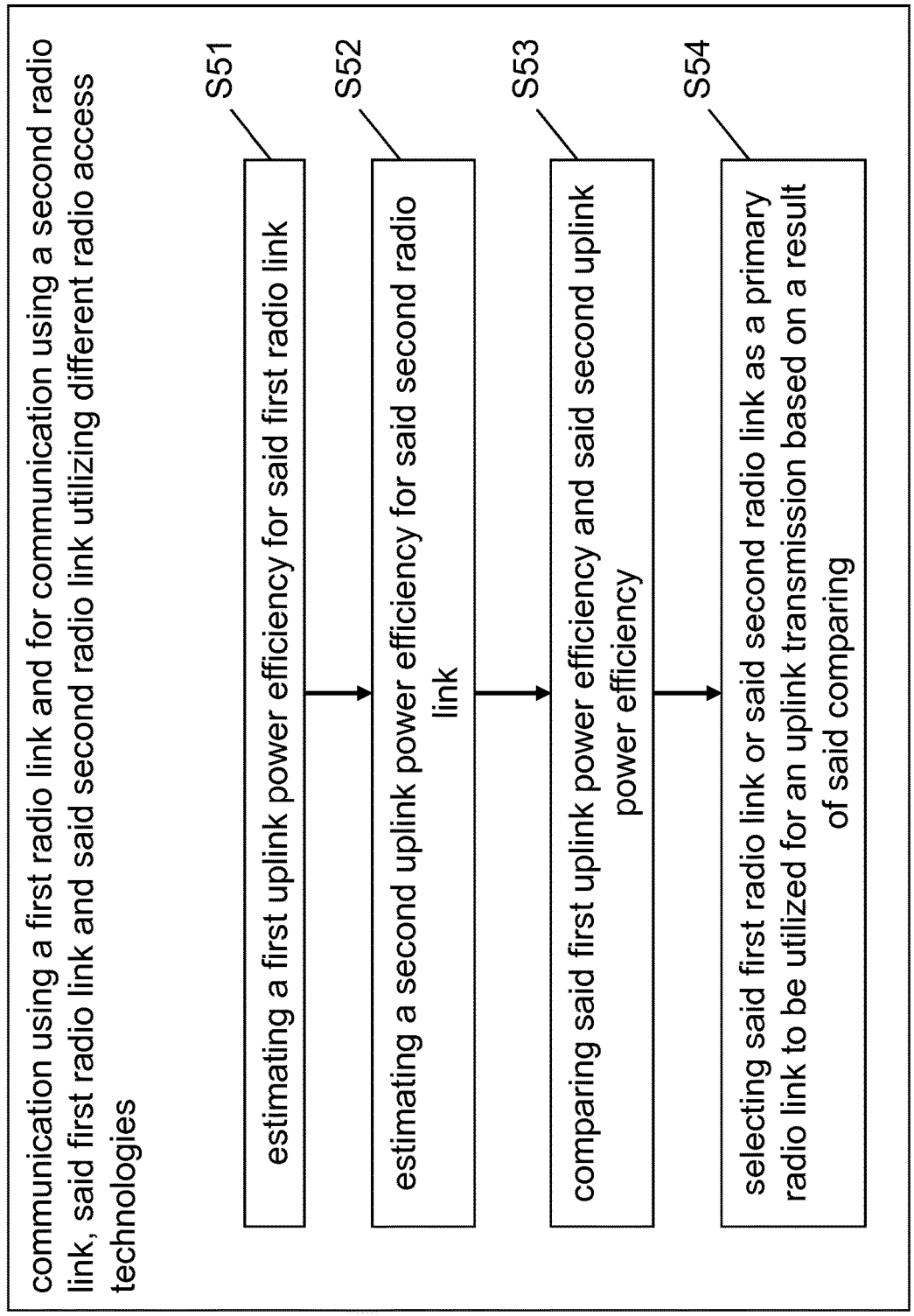
FIG. 5 is a schematic diagram of a procedure according to exemplary embodiments of the present invention.

FIG. 5 is a schematic diagram of a procedure according to exemplary embodiments of the present invention. The apparatus according to FIG. 1 may perform the method of FIG. 5 but is not limited to this method. The method of FIG. 5 may be performed by the apparatus of FIG. 1 but is not limited to being performed by this apparatus.

As shown in FIG. 5, a procedure (for example operable in at least one of a LTE and a LTE-A cellular system) according to exemplary embodiments of the present invention comprises an operation of estimating (S51) a first uplink power efficiency for said first radio link, an operation of estimating (S52) a second uplink power efficiency for said second radio link, an operation of comparing (S53) said first uplink power efficiency and said second uplink power efficiency, and an operation of selecting (S54) said first radio link or said second radio link as a primary radio link to be utilized for an uplink transmission based on a result of said comparing (S53).

While the selecting operation (S54) is based on the result of the comparing operation (S53), i.e. based on uplink power efficiencies, it is not excluded that further quantities or metrics like e.g. channel availability, scheduling grants are considered for the selecting operation (S54) as well.

Figure 2:
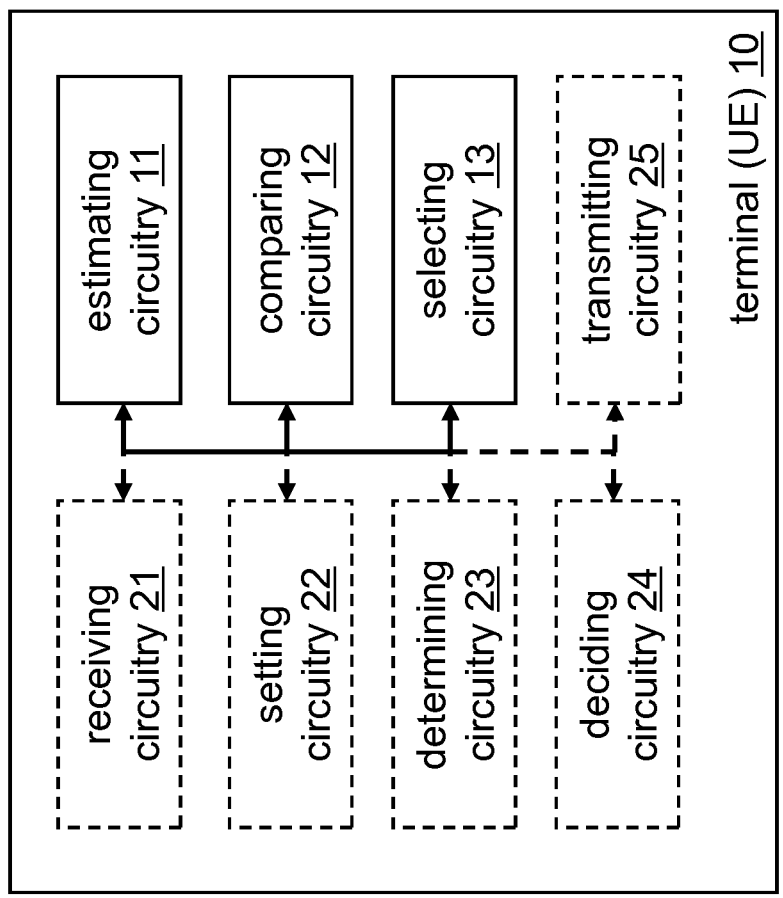
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise receiving circuitry 21, setting circuitry 22, determining circuitry 23, deciding circuitry 24, and/or transmitting circuitry 25.

In this regard, it is noted that for a UE operating in dual-connectivity associated to two radio links (e.g. LTE and WLAN) which may be able to transmit uplink data via either radio link or both radio links simultaneously for the same radio bearer, the primary radio link is defined as the radio link used for the uplink transmission in case uplink bearer switch is used (i.e. only one radio link is used at the time). In case of uplink bearer split (i.e. both links are used simultaneously), the primary radio link may be the radio link to be used first before the secondary radio link is taken into use.

According to a variation of the procedure shown in FIG. 5, exemplary details of the comparing operation (S53) are given, which are inherently independent from each other as such. Namely, while according such exemplary embodiments of the present invention said first radio link is pre-configured as said primary radio link, by such exemplary comparing operation (S53) said second uplink power efficiency is compared to a sum of said first uplink power efficiency and a predetermined margin parameter, wherein said first radio link is selected as said primary radio link, if said second uplink power efficiency is not greater than said sum.

According to further exemplary embodiments of the present invention, said second radio link is selected as said primary radio link, if said second uplink power efficiency is greater than said sum.

According to a variation of the procedure shown in FIG. 5, exemplary details of the comparing operation (S53) are given, which are inherently independent from each other as such. Namely, while according such exemplary embodiments of the present invention said first radio link is pre-configured as said primary radio link, by such exemplary comparing operation (S53) said second uplink power efficiency is compared to a product of said first uplink power efficiency and a predetermined margin parameter, wherein said first radio link is selected as said primary radio link, if said second uplink power efficiency is not greater than said product.

According to further exemplary embodiments of the present invention, said second radio link is selected as said primary radio link, if said second uplink power efficiency is greater than said product.

According to still further exemplary embodiments of the present invention, said second uplink power efficiency may be compared with any other mathematical combination or combinations of said first uplink power efficiency and the predetermined margin parameter, e.g. hybrid mathematical combinations including addition and multiplication.

In addition, according to still further exemplary embodiments, the margin parameter may comprise a plurality of margin parameter components, each considered for a specific mathematical combination with a specific uplink power efficiency. As a non-limiting example, the margin parameter may comprise a first margin parameter component to be multiplied with the first uplink power efficiency and a second margin parameter component to be multiplied with the second uplink power efficiency. As a further non-limiting example, the margin parameter may comprise a first margin parameter component to be multiplied with the first uplink power efficiency and a second margin parameter component to be added to the second uplink power efficiency.

According to a variation of the procedure shown in FIG. 5, exemplary additional operations are given, which are inherently independent from each other as such. According to such variation, an exemplary method according to exemplary embodiments of the present invention may comprise an operation of receiving first configuration information indicative of said pre-configured primary radio link, and an operation of receiving second configuration information indicative of said predetermined margin parameter.

According to a further variation of the procedure shown in FIG. 5, exemplary additional operations are given, which are inherently independent from each other as such. According to such variation, an exemplary method according to exemplary embodiments of the present invention may comprise an operation of transmitting information indicative of the radio link selected as said primary radio link among said first radio link and said second radio link being a preferred primary radio link.

According to a further variation of the procedure shown in FIG. 5, exemplary additional operations are given, which are inherently independent from each other as such. According to such variation, an exemplary method according to exemplary embodiments of the present invention may comprise an operation of receiving control information indicative of confirmation or change of the radio link selected as said primary radio link among said first radio link and said second radio link, and an operation of, if said control information is indicative of change of the radio link selected as said primary radio link among said first radio link and said second radio link, changing the radio link selected as said primary radio link among said first radio link and said second radio link based on the control information.

According to a further variation of the procedure shown in FIG. 5, exemplary additional operations are given, which are inherently independent from each other as such. According to such variation, an exemplary method according to exemplary embodiments of the present invention may comprise an operation of setting the radio link not selected as said primary radio link among said first radio link and said second radio link as a secondary radio link.

According to a still further variation of the procedure shown in FIG. 5, exemplary additional operations are given, which are inherently independent from each other as such. According to such variation, an exemplary method according to exemplary embodiments of the present invention may comprise an operation of determining uplink resources allocated to said primary radio link, an operation of estimating needed uplink transmission power corresponding to an uplink transmission utilizing said determined uplink resources, an operation of estimating remaining uplink transmission power as a difference between a maximum available uplink transmission power and said estimated needed uplink transmission power, and an operation of deciding whether to deploy bearer split utilizing said secondary radio link based on said estimated remaining uplink transmission power and an uplink buffer size.

According to still further exemplary embodiments of the present invention, it is decided to deploy said bearer split, if said estimated remaining uplink transmission power is greater than a predetermined remaining transmission power threshold and said uplink buffer size is greater than a predetermined uplink buffer size threshold.

According to still further exemplary embodiments of the present invention, said predetermined remaining uplink transmission power threshold is 0.

According to a still further variation of the procedure shown in FIG. 5, exemplary additional operations are given, which are inherently independent from each other as such. According to such variation, an exemplary method according to exemplary embodiments of the present invention may comprise an operation of receiving third configuration information indicative of said predetermined uplink buffer size threshold.

According to a still further variation of the procedure shown in FIG. 5, exemplary additional operations are given, which are inherently independent from each other as such. According to such variation, an exemplary method according to exemplary embodiments of the present invention may comprise an operation of receiving threshold information indicative of a data amount threshold, wherein it is decided to deploy said bearer split, if an amount of data to be transmitted over said secondary radio link is greater than said data amount threshold.

According to still further exemplary embodiments of the present invention, said data amount threshold is defined as an absolute amount.

According to still further exemplary embodiments of the present invention, said data amount threshold is defined as a ratio with respect to an amount of data to be transmitted over said primary radio link.

According to still further exemplary embodiments of the present invention, said radio access technologies include 3G, 4G, 5G, LTE, Bluetooth, and Wi-Fi.

According to still further exemplary embodiments of the present invention, said first uplink power efficiency is an uplink radio throughput per power unit on said first radio link.

In other words, power efficiency is the throughput per power unit (Watt) the terminal (UE) can send in the uplink on a particular radio link, and may for example be defined in bps/W, that is, in bits per second (i.e. bit rate)/Watt (i.e. (transmission) power).

According to still further exemplary embodiments of the present invention, said second uplink power efficiency is an uplink radio throughput per power unit on said second radio link.

In more specific terms, according to exemplary embodiments of the present invention, the UE may determine dynamically the primary (radio) link to be used for uplink transmission of a given bearer among the two or more radio links available/configured for transmission.

The decision may be assisted by the network in the form of the initial configuration of the primary (radio) link and at least a power efficiency (PE) margin (parameter). Namely, according to exemplary embodiments of the present invention, the UE shall select the secondary link as primary (radio) link if the secondary link's power efficiency (e.g. UL MCS estimate) exceeds the primary's link power efficiency estimate plus the PE margin (parameter).

As also discussed above, the secondary link's power efficiency may not only be compared with the primary's link power efficiency estimate plus the PE margin (parameter) but instead with the primary's link power efficiency estimate multiplied with the PE margin (parameter) or with any other mathematical combination or combinations of the primary's link power efficiency estimate and the PE margin (parameter).

Additionally, bearer split may be triggered based on the uplink buffer size. However, bearer split is used depending on resources allocated by the selected primary link and the UL transmission power needed to transmit over the primary link according to the allocated resources. In case there is both UL transmission power available and data in the buffer available, the secondary link can be used accordingly by means of bearer split.

Figure 3:
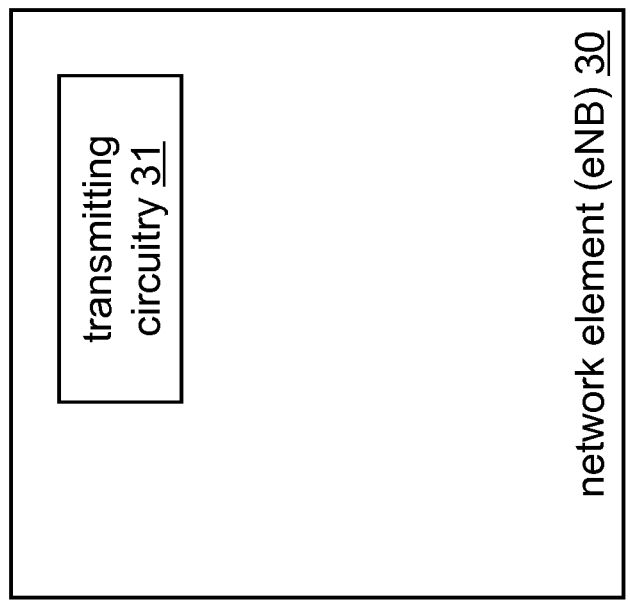
FIG. 3 is a block diagram illustrating an apparatus according to exemplary embodiments of the present invention.
Figure 6:
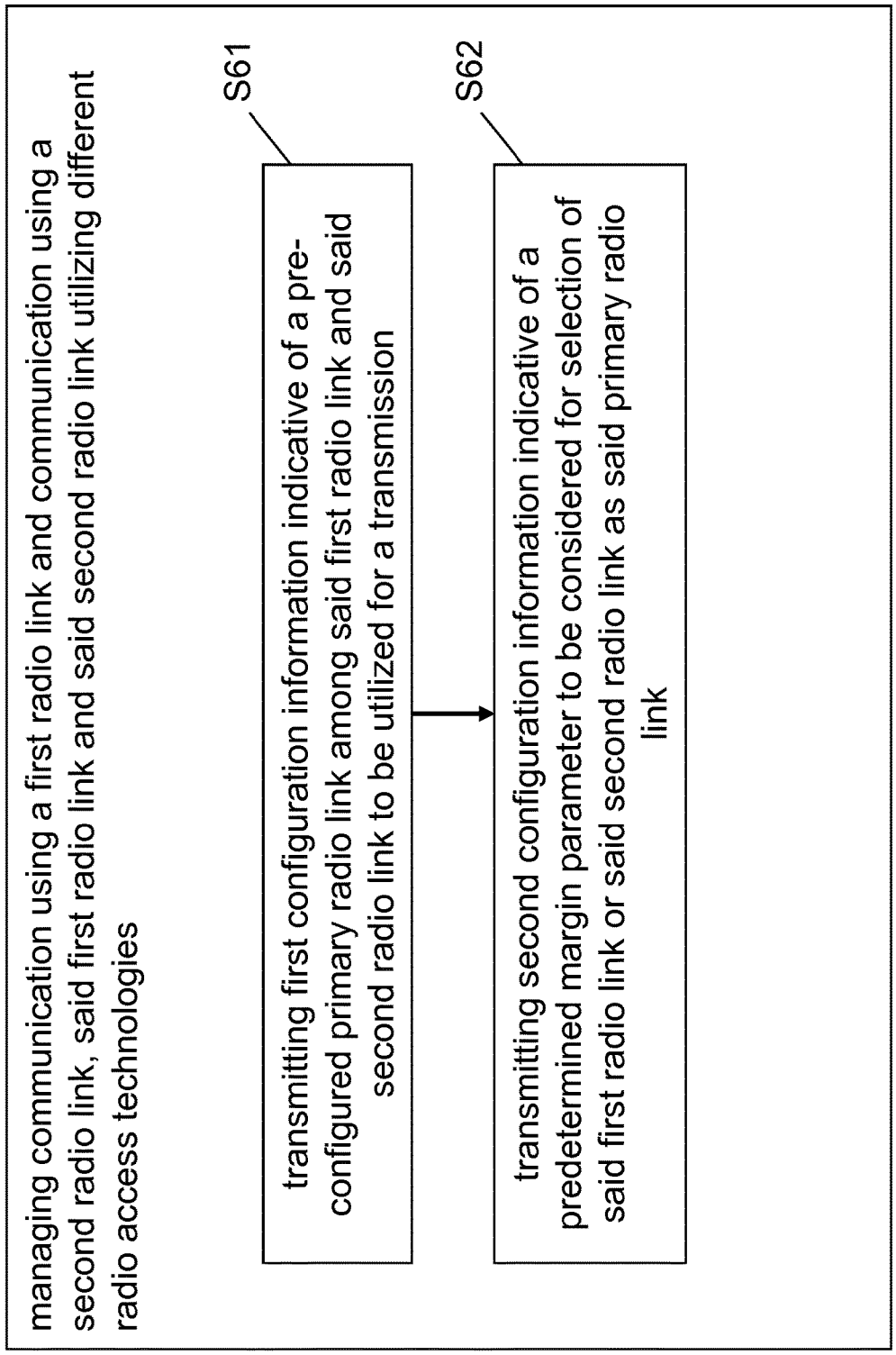
FIG. 6 is a schematic diagram of a procedure according to exemplary embodiments of the present invention.
Figure 7:
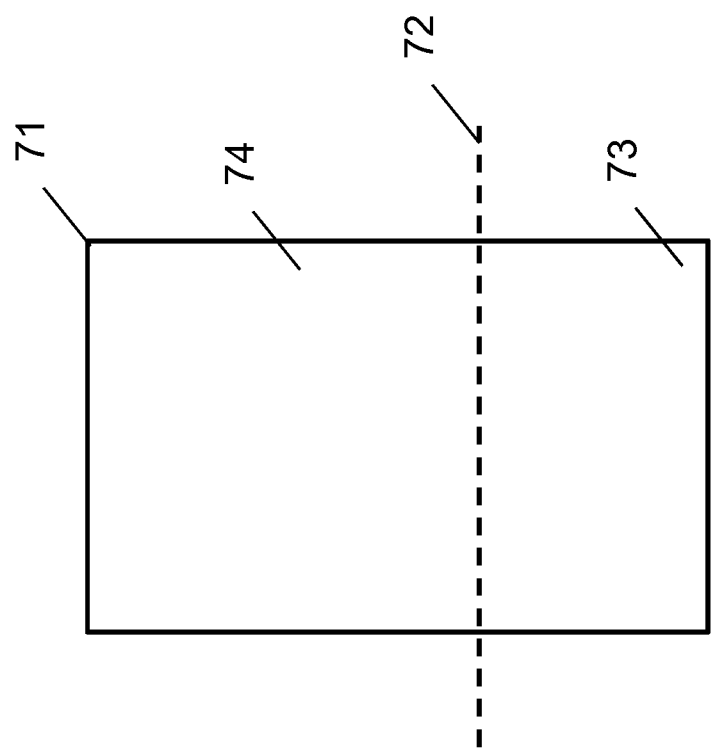
FIG. 7 is a schematic diagram illustrating the LTE dual connectivity DC bearer split concept.

FIG. 3 is a block diagram illustrating an apparatus according to exemplary embodiments of the present invention. The apparatus may be a network element 30 such as an evolved NodeB, or more general, base station or access node of a cellular system (configured for managing communication using a first radio link and communication using a second radio link, said first radio link and said second radio link utilizing different radio access technologies) comprising a transmitting circuitry 31. The transmitting circuitry 31 transmits first configuration information indicative of a pre-configured primary radio link among said first radio link and said second radio link to be utilized for a transmission. Further, the transmitting circuitry 31 transmits second configuration information indicative of a predetermined margin parameter to be considered for selection of said first radio link or said second radio link as said primary radio link. FIG. 6 is a schematic diagram of a procedure according to exemplary embodiments of the present invention. The apparatus according to FIG. 3 may perform the method of FIG. 6 but is not limited to this method. The method of FIG. 6 may be performed by the apparatus of FIG. 3 but is not limited to being performed by this apparatus.

As shown in FIG. 6, a procedure (for example operable in at least one of a LTE and a LTE-A cellular system) according to exemplary embodiments of the present invention comprises an operation of transmitting (S61) first configuration information indicative of a pre-configured primary radio link among said first radio link and said second radio link to be utilized for a transmission, and an operation of transmitting (S62) second configuration information indicative of a predetermined margin parameter to be considered for selection of said first radio link or said second radio link as said primary radio link.

Figure 4:
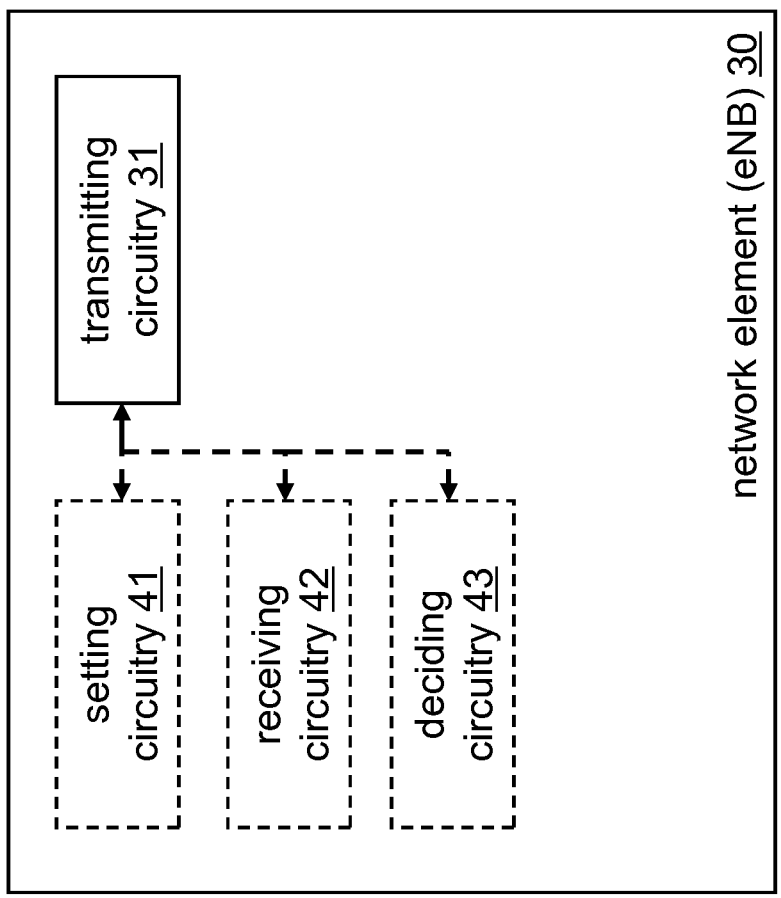
FIG. 4 is a block diagram illustrating an apparatus according to exemplary embodiments of the present invention.

FIG. 4 is a block diagram illustrating an apparatus according to exemplary embodiments of the present invention. In particular, FIG. 4 illustrates a variation of the apparatus shown in FIG. 3. The apparatus according to FIG. 4 may thus further comprise setting circuitry 41, receiving circuitry 42, and/or deciding circuitry 43.

In an embodiment at least some of the functionalities of the apparatus shown in FIG. 3 may be shared between two physically separate devices forming one operational entity. Therefore, the apparatus may be seen to depict the operational entity comprising one or more physically separate devices for executing at least some of the described processes.

According to a variation of the procedure shown in FIG. 6, exemplary additional operations are given, which are inherently independent from each other as such. According to such variation, an exemplary method according to exemplary embodiments of the present invention may comprise an operation of setting said predetermined margin parameter on the basis of network side requirements.

According to exemplary embodiments of the present invention, said predetermined margin parameter is set the higher the more the network side requires utilization of said pre-configures primary radio link for said transmission.

According to a further variation of the procedure shown in FIG. 6, exemplary additional operations are given, which are inherently independent from each other as such. According to such variation, an exemplary method according to exemplary embodiments of the present invention may comprise an operation of receiving information indicative of the radio link selected as said primary radio link among said first radio link and said second radio link being a preferred primary radio link, an operation of deciding to confirm or change the radio link selected as said primary radio link among said first radio link and said second radio link, and an operation of transmitting control information indicative of a result of said deciding.

According to a still further variation of the procedure shown in FIG. 6, exemplary additional operations are given, which are inherently independent from each other as such. According to such variation, an exemplary method according to exemplary embodiments of the present invention may comprise an operation of transmitting third configuration information indicative of a predetermined uplink buffer size threshold to be considered for decision whether to deploy bearer split utilizing a secondary radio link being the radio link not selected as said primary radio link among said first radio link and said second radio link.

According to a still further variation of the procedure shown in FIG. 6, exemplary additional operations are given, which are inherently independent from each other as such. According to such variation, an exemplary method according to exemplary embodiments of the present invention may comprise an operation of transmitting threshold information indicative of a data amount threshold to be considered for said decision whether to deploy said bearer split.

According to further exemplary embodiments of the present invention, said data amount threshold is defined as an absolute amount.

According to still further exemplary embodiments of the present invention, said data amount threshold is defined as a ratio with respect to an amount of data to be transmitted over said primary radio link.

According to still further exemplary embodiments of the present invention, said radio access technologies include 3G, 4G, 5G, LTE, Bluetooth, and Wi-Fi.

Figure 8:
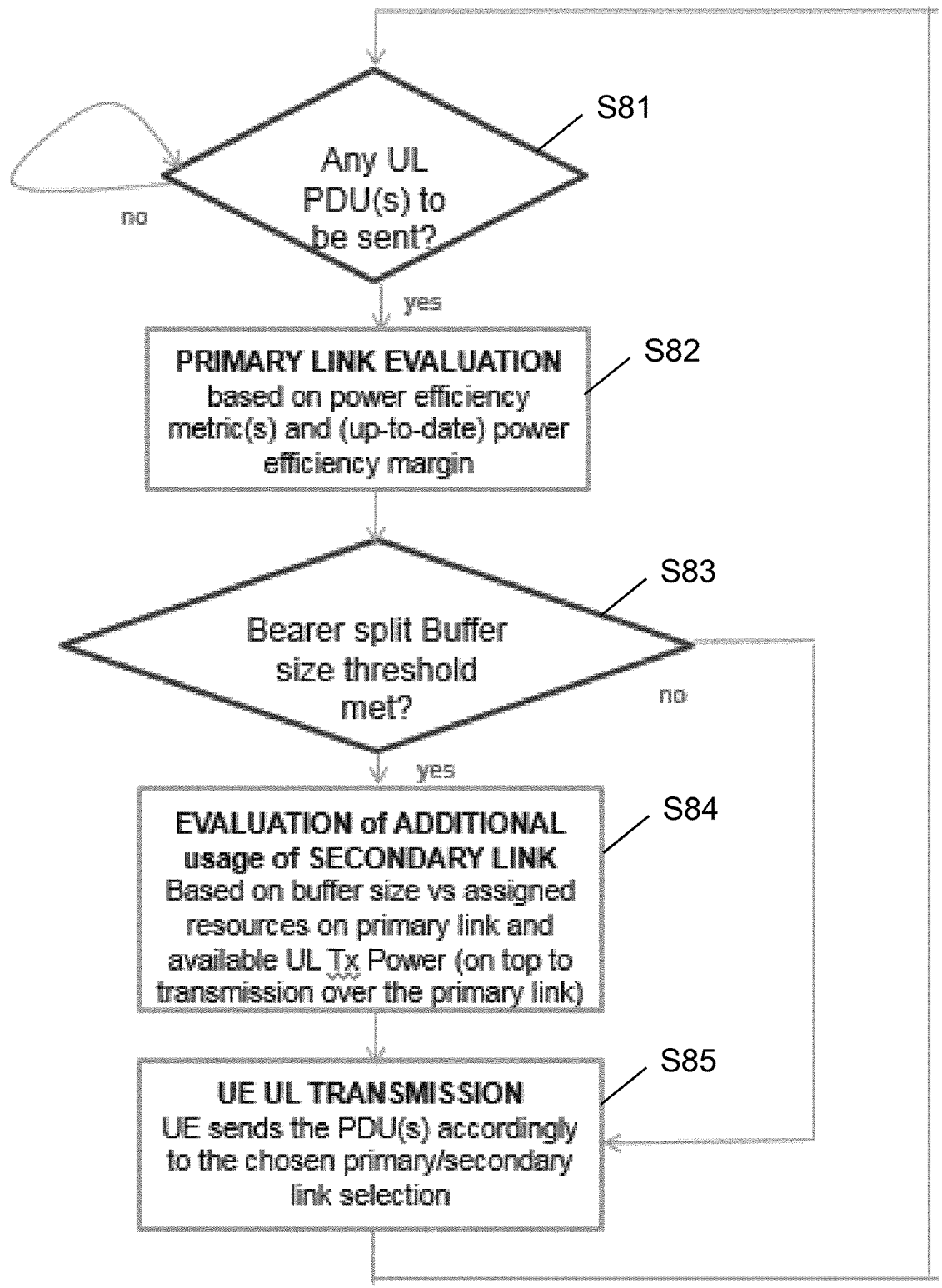
FIG. 8 is a schematic diagram alternatively illustrating a procedure according to exemplary embodiments of the present invention.

FIG. 8 is a schematic diagram alternatively illustrating an above-described procedure according to exemplary embodiments of the present invention.

Hence, the above-described approach, viewed from the UE perspective, is hereinafter explained in more specific terms with reference to that FIG. 8.

In a step S81, it is checked whether any protocol/packet data unit (PDU) is to be sent from the UE to the network. If the result of the checking is no, the process returns to step S81 until there is any PDU to be sent.

If the result of the checking (S81) is yes, the process proceeds to step S82.

In step S82, a primary link evaluation is effected based on power efficiency metric(s) and an (up-to-date) power efficiency margin (parameter).

In particular, in step S82, the UE estimates the power efficiency metric (e.g. UL MCS) towards the eNB based on e.g. LTE RSRP/RSRQ/CQI measurements which are run periodically towards the serving cell for mobility/scheduling purposes.

Further, in step S82, the UE estimates the power efficiency metric towards the WLAN AP based to e.g. Wi-Fi RSSI measurements, 802.11 standard support by UE and AP, MIMO streams supported by UE and AP, BSS load, etc., which are known from regular WLAN measurements and/or included in the Wi-Fi AP beacon signaling, or are pre-known at the WI-Fi modem.

It is noted that the above-mentioned two estimations do not necessarily have to be effected in step S82 but instead in step S82 it might be referred to results of such estimations performed independently of the process depicted in FIG. 8 (e.g. periodically).

Further, in step S82, the UE compares LTE power efficiency metric (PE_LTE) estimate to Wi-Fi power efficiency (PE_WLAN) estimate.

Under the assumption that LTE is configured as the initial primary link and the PE margin PE_M is provided to the UE,
  if PE_WLAN>PE_LTE+PE_M,
  then the primary link is switched to be WLAN (Wi-Fi) in the current transmission,
  otherwise LTE is kept as primary link in the current transmission.

This result is of course to be reversed for the case that it is assumed that Wi-Fi was initially configured as the initial primary radio link.

Namely, under the assumption that Wi-Fi is configured as the initial primary link and the PE margin PE_M is provided to the UE,
  if PE_LTE>PE_WLAN+PE_M,
  then the primary link is switched to be LTE in the current transmission,
  otherwise Wi-Fi is kept as primary radio link in the current transmission.

After primary link evaluation, the process proceeds to step S83.

In step S83, the buffer size is compared with the buffer size threshold. That is, it is determined whether the bearer split buffer size threshold is met.

If the bearer split buffer size threshold is met (yes in step S83), then the process proceeds further to step S84.

If, on the other hand, the bearer split buffer size threshold is not met (no in step S83), then the process proceeds further to step S85.

In step S84, an evaluation of additional usage of the (a) secondary radio link (bearer split) is effected based on the buffer size in comparison to the assigned resources on the primary link, and on available uplink transmission power ("on top to transmission power (to be) utilized over the primary link").

Namely, in step S84, the bearer split decision is made based on how much data could be sent via the primary link selected/evaluated in the previous step (S82) given the resources assigned to the UE (e.g. scheduling grant in LTE, possibility to grab the channel and/or transmission (Tx) opportunity in WLAN), and given the available UE Tx power which would be available at the UE, if any, after transmitting over the primary link at most efficient MCS/power level.

Here, it is noted that the eNB may indicate to the UE the amount of data that at minimum has to be served over the secondary link before it should be taken into use in a time interval. That indication could be also relative to the amount of data served over the primary link.

After bearer split decision in step S84, the process proceeds to step S85.

In step S85, the UE's uplink transmission is actually effected. That is, in step S85, the UE sends the PDU(s) to be sent accordingly to the chosen primary/secondary link selection.

Here, it is noted that subsequently to step S82, the UE may inform the eNB of the result of the primary link evaluation, that is, of the selected primary link as a preferred/preferable primary link. In response thereto, the eNB may finally decide on the actually to be used primary link and may then inform the UE of the result of the decision, i.e., may configure/re-configure the UE with the primary link actually to be used, which may be the primary link selected by the UE, but which may also be a different primary link.

According to exemplary embodiments of the present invention, the UE is allowed to fast switch the primary link for uplink transmissions in the LWA connection with the objective to optimally use the UE transmit power which is the limited resource. The eNB remains in control of whether the UE should use preferably a primary link by providing (a) margin parameter(s) which determine(s) how better the secondary link had to be before the UE can switch transmission to it. Higher values of the margin (parameter) would be set in case the eNB has benefit that the UE keeps using the primary link only/mainly irrespective of the optimal power usage, and vice-versa. Also, the addition usage of the secondary link is such that only if there is additional power available and additional data in the UE buffer, bearer split is used.

Thus, an optimal use of the UE transmission power can be achieved.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 9:
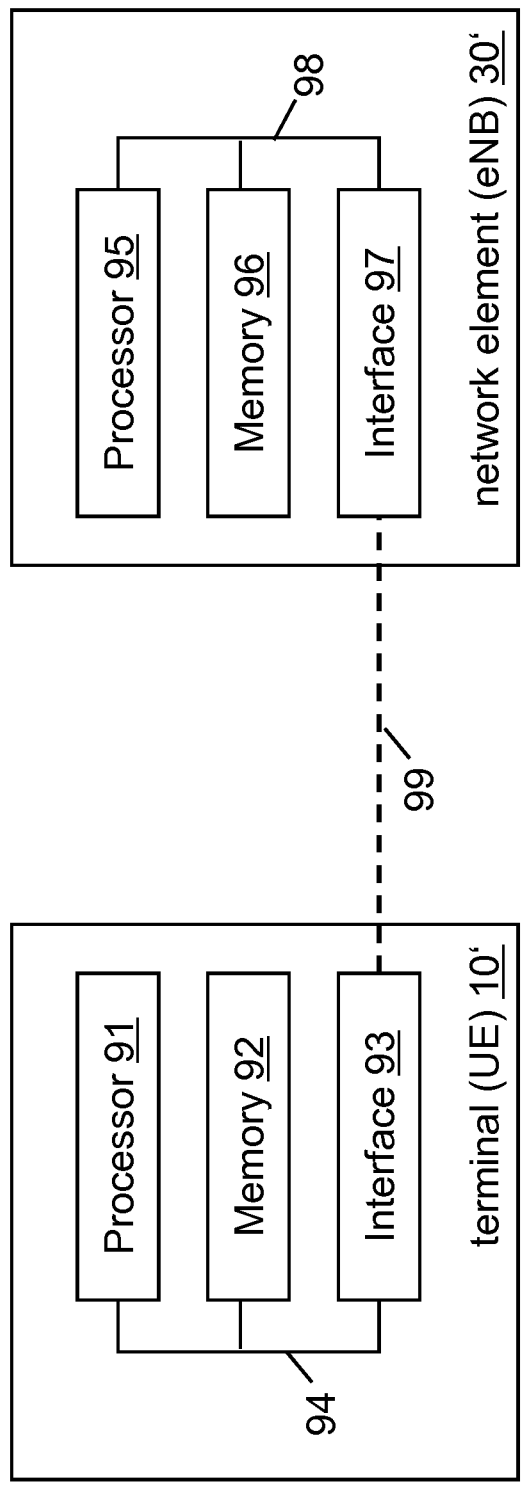
FIG. 9 is a block diagram alternatively illustrating apparatuses according to exemplary embodiments of the present invention.

In FIG. 9, an alternative illustration of apparatuses according to exemplary embodiments of the present invention is depicted. As indicated in FIG. 9, according to exemplary embodiments of the present invention, the apparatus (terminal) 10' (corresponding to the terminal 10) comprises a processor 91, a memory 92 and an interface 93, which are connected by a bus 94 or the like. Further, according to exemplary embodiments of the present invention, the apparatus (network element) 30' (corresponding to the network element 30) comprises a processor 95, a memory 96 and an interface 97, which are connected by a bus 98 or the like, and the apparatuses may be connected via link 99, respectively.

The processor 91/95 and/or the interface 93/97 may also include a modem or the like to facilitate communication over a (hardwire or wireless) link, respectively. The interface 93/97 may include a suitable transceiver coupled to one or more antennas or communication means for (hardwire or wireless) communications with the linked or connected device(s), respectively. The interface 93/97 is generally configured to communicate with at least one other apparatus, i.e. the interface thereof.

The memory 92/96 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the terminal 10 (configured for communication using a first radio link and for communication using a second radio link, said first radio link and said second radio link utilizing different radio access technologies) comprises at least one processor 91, at least one memory 92 including computer program code, and at least one interface 93 configured for communication with at least another apparatus. The processor (i.e. the at least one processor 91, with the at least one memory 92 and the computer program code) is configured to perform estimating a first uplink power efficiency for said first radio link (thus the apparatus comprising corresponding means for estimating), to perform estimating a second uplink power efficiency for said second radio link, to perform comparing said first uplink power efficiency and said second uplink power efficiency (thus the apparatus comprising corresponding means for comparing), and to perform selecting said first radio link or said second radio link as a primary radio link to be utilized for an uplink transmission based on a result of said comparing (thus the apparatus comprising corresponding means for selecting).

Further, according to exemplary embodiments of the present invention, an apparatus representing the network element 30 (configured for managing communication using a first radio link and communication using a second radio link, said first radio link and said second radio link utilizing different radio access technologies) comprises at least one processor 95, at least one memory 96 including computer program code, and at least one interface 97 configured for communication with at least another apparatus. The processor (i.e. the at least one processor 95, with the at least one memory 96 and the computer program code) is configured to perform transmitting first configuration information indicative of a pre-configured primary radio link among said first radio link and said second radio link to be utilized for a transmission (thus the apparatus comprising corresponding means for transmitting), and to perform transmitting second configuration information indicative of a predetermined margin parameter to be considered for selection of said first radio link or said second radio link as said primary radio link.

For further details regarding the operability/functionality of the individual apparatuses, reference is made to the above description in connection with any one of FIGS. 1 to 8, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for achieving power efficiency in multiple radio access technologies scenarios. Such measures exemplarily comprise, in a communication scenario using a first radio link and for communication using a second radio link, said first radio link and said second radio link utilizing different radio access technologies, estimating a first uplink power efficiency for said first radio link, estimating a second uplink power efficiency for said second radio link, comparing said first uplink power efficiency and said second uplink power efficiency, and selecting said first radio link or said second radio link as a primary radio link to be utilized for an uplink transmission based on a result of said comparing.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
AC (WLAN) access controller

ACU available channel utilization
AP (WLAN) access point
AWCU Actual WLAN Channel Utilization
DC dual connectivity
eNB evolved NodeB, eNodeB
EPS Evolved Packet System
ID identifier
IPsec internet protocol security
IW interworking
LTE Long Term Evolution
LWA LTE-WLAN aggregation
LWIP LTE-WLAN radio level integration via IPsec tunneling
MCS modulation and coding scheme
PA power amplifier
PDCP Packet Data Convergence Protocol
PDU protocol/packet data unit
PE power efficiency
PRB physical resource block
RAN radio access network
RAT radio access technology
RCPI received channel power indicator
RRC radio resource control
RSRP reference signal received power
RSNI received signal to noise indicator
RSSI received signal strength indicator
STA station
TPC transmission power control
Tx transmission
UE user equipment
UL uplink
WLAN wireless local area network

The invention claimed is:

1. A method of a terminal configured for communication using a first radio link towards a first access node and for communication using a second radio link towards a second access node, said first radio link and said second radio link utilizing different radio access technologies, said method comprising:
estimating a first uplink power efficiency for said first radio link,
estimating a second uplink power efficiency for said second radio link,
comparing said first uplink power efficiency and said second uplink power efficiency in connection with a power efficiency parameter provided from the first access node for primary radio link selection, and
selecting said first radio link or said second radio link as a primary radio link to be utilized for simultaneous uplink transmissions over said first radio link towards said first access node and said second radio link towards said second access node based on a result of said comparing.

2. The method according to claim 1, wherein
said first radio link is pre-configured as said primary radio link, and
in relation to said comparing
said second uplink power efficiency is compared to a sum of said first uplink power efficiency and a predetermined margin parameter,
wherein said first radio link is selected as said primary radio link, if said second uplink power efficiency is not greater than said sum.

3. The method according to claim 2, wherein
said second radio link is selected as said primary radio link, if said second uplink power efficiency is greater than said sum.

4. The method according to claim 1, wherein
said first radio link is pre-configured as said primary radio link, and
in relation to said comparing
said second uplink power efficiency is compared to a product of said first uplink power efficiency and a predetermined margin parameter,
wherein said first radio link is selected as said primary radio link, if said second uplink power efficiency is not greater than said product.

5. The method according to claim 4, wherein
said second radio link is selected as said primary radio link, if said second uplink power efficiency is greater than said product.

6. The method according to claim 2, further comprising
receiving first configuration information indicative of said pre-configured primary radio link, and
receiving second configuration information indicative of said predetermined margin parameter.

7. The method according to claim 1, further comprising
transmitting information indicative of the radio link selected as said primary radio link among said first radio link and said second radio link being a preferred primary radio link.

8. The method according to claim 7, further comprising
receiving control information indicative of confirmation or change of the radio link selected as said primary radio link among said first radio link and said second radio link, and
if said control information is indicative of change of the radio link selected as said primary radio link among said first radio link and said second radio link, changing the radio link selected as said primary radio link among said first radio link and said second radio link based on the control information.

9. The method according to claim 1, further comprising
setting the radio link not selected as said primary radio link among said first radio link and said second radio link as a secondary radio link.

10. The method according to claim 9, further comprising
determining uplink resources allocated to said primary radio link,
estimating needed uplink transmission power corresponding to an uplink transmission utilizing said determined uplink resources,
estimating remaining uplink transmission power as a difference between a maximum available uplink transmission power and said estimated needed uplink transmission power, and
deciding whether to deploy bearer split utilizing said secondary radio link based on said estimated remaining uplink transmission power and an uplink buffer size.

11. The method according to claim 10, wherein
it is decided to deploy said bearer split, if said estimated remaining uplink transmission power is greater than a predetermined remaining transmission power threshold and said uplink buffer size is greater than a predetermined uplink buffer size threshold.

12. The method according to claim 11, wherein
said predetermined remaining uplink transmission power threshold is 0, and/or
the method further comprising
receiving third configuration information indicative of said predetermined uplink buffer size threshold.

13. The method according to claim 11, further comprising
receiving threshold information indicative of a data amount threshold, wherein it is decided to deploy said bearer split, if an amount of data to be transmitted over said secondary radio link is greater than said data amount threshold.

14. The method according to claim 13, further comprising:
receiving information indicative of the radio link selected as said primary radio link among said first radio link and said second radio link being a preferred primary radio link,
deciding to confirm or change the radio link selected as said primary radio link among said first radio link and said second radio link, and
transmitting control information indicative of a result of said deciding.

15. The method according to claim 13, further comprising:
transmitting third configuration information indicative of a predetermined uplink buffer size threshold to be considered for decision whether to deploy bearer split utilizing a secondary radio link being the radio link not selected as said primary radio link among said first radio link and said second radio link.

16. The method according to claim 15, further comprising transmitting threshold information indicative of a data amount threshold to be considered for said decision whether to deploy said bearer split.

17. An apparatus, comprising:
at least one processor; and
at least one memory including computer program code;
the at least one memory and the computer program code configured to, with the at least one processor, cause the apparatus at least to perform:
estimating a first uplink power efficiency for a first radio link,
estimating a second uplink power efficiency for a second radio link,
comparing said first uplink power efficiency and said second uplink power efficiency in connection with a power efficiency parameter provided from a first access node for primary radio link selection, and
selecting said first radio link or said second radio link as a primary radio link to be utilized for simultaneous uplink transmissions over said first radio link towards said first access node and said second radio link towards a second access node based on a result of said comparing.

* * * * *